Patented Jan. 17, 1933

1,894,774

UNITED STATES PATENT OFFICE

WINTHROP STANLEY LAWRENCE, OF NEW YORK, N. Y., ASSIGNOR TO KAUMAGRAPH COMPANY, OF NEW YORK, N. Y., A CORPORATION OF NEW YORK

TRANSFER

No Drawing.   Application filed July 23, 1930.   Serial No. 471,422.

My invention relates to a new and improved transfer.

One of the objects of my invention is to provide a new and improved transfer of the heat type, that is, a transfer comprising a paper base on which an impression is made by means of a fusible marking composition, so that the marking is released from the base by the action of heat. In order to accomplish the release of the marking from the transfer, it is customary to apply a hot flat-iron to the rear of the transfer base while the marking is in contact with the material to be marked.

Another object of my invention is to provide a transfer which can yield a marking which is resistant to the action of washing fluids and other solutions.

Another object of my invention is to provide a transfer having an improved marking composition which includes asphalt.

Other objects of my invention will be set forth in the following description which illustrates a preferred embodiment thereof, it being understood that the above general statement of the objects of my invention is intended to generally explain the same and not to limit it in any manner.

Numerous formulas have been proposed for transfering marking compositions by means of which an indelible marking can be impressed upon linen and other fabrics in order to identify the same. These indelible markings are resistant to the action of the various liquids used in laundry operations.

I prefer to use asphalt in the form of an emulsion, although the asphalt may be used in other forms. For example, the asphalt utilized may be a hard plastic mass which is free from solvents or pigment fillers, and which has been dissolved in petroleum, or other solvent. Likewise, the asphalt may be utilized in certain commercial forms containing nonsoluble ingredients, such as mica, asbestos, etc. However, I prefer to use the asphalt in the form of an emulsion which includes a suspension or dispersing agent, such as Bentonite clay, etc.

Likewise, I prefer to combine the asphalt with water-resistant substances, such as ozokerite, para cumarone resin (known commercially as cumar), carnauba wax, in order to adapt it for printing purposes. Likewise, I may incorporate a coloring medium such as nigrosine, induline, or carbon black.

Any suitable solvent may be employed to dilute the composition to the suitable consistency, and the composition may be utilized as an ink, as a printing paste, or it may be applied with a pen.

I prefer to use as the starting material an asphalt emulsion, which contains about sixty per cent of asphalt and suspending agent as a disperse phase, and which contains forty per cent of water as a continuous phase. The coloring material is added to the emulsion together with the other ingredients and the entire mixture is heated until the water is wholly or partially driven off. Of course, the ingredients are intimately mixed before the water is driven off. The composition is then ready for printing, or a suitable solvent may be added in order to make it possible to utilize the composition as a direct marking composition. Likewise, it is possible to merely add water to the composition in order to reduce its consistency, and suitable linseed oil varnishes may be added to adapt the composition for use on a printing press. An example of the invention is as follows, the proportions being by weight:—

| | Parts |
|---|---|
| Hard black asphalt emulsion | 200 |
| V. L. Cumar (para-cumarone resin) | 20 |
| 68° ozokerite | 20 |
| Micronex black | 20 |

The "V. L. Cumar" is a hard cumar known as the varnish grade.

The "Micronex black" is a special carbon black made for the rubber trade.

Any other coloring matter of a permanent nature can be utilized and an asphalt of lighter color may also be utilized. However, I prefer to use the black asphalt in order to form a black and indelible transfer or ink. When the water is wholly or partially driven out of the asphalt emulsion above mentioned, the solid product has a porous or honeycomb structure, and it also has a very low gradient of viscosity change when heated. That is, the clay which has been employed as a suspension agent, acts to retard the liquefaction of the asphalt composition, when the same is heated. This permits the use of a relatively high temperature, so that the asphalt composition can secure good penetration in the fabric, while also making it possible to secure a sharp clean mark on the fabric, or other material which is being marked. This makes it possible to mark articles having relatively hard surfaces without causing the marking to run or smear.

It might be expected that the high mineral content of the composition would cause it to adhere only loosely to the fibre of the fabric or other material, but experience has shown that a transfer marking made by the use of the composition will last for several hundred washings.

Bronze powder or other coloring material, such as, pigments, may be added to the composition in order to secure a permanent and more decorative effect.

Since asphalt is not attacked by the air or by aqueous alkaline solutions, it forms a very desirable base for marking compositions, or the like.

I have shown a preferred embodiment of my invention, but it is clear that numerous changes and omissions can be made without departing from its spirit.

I claim:

1. A heat transfer comprising a paper base having a fusible marking thereon, said marking comprising a major portion of asphalt intermixed with colloidal non-fusible material.

2. A heat transfer comprising a paper base having a fusible marking thereon, said marking comprising a major portion of asphalt intermixed with colloidal clay.

3. A heat transfer comprising a paper base having a fusible marking thereon, said marking comprising a major portion of asphalt intermixed with finely divided non-fusible material, and additional fusible material of the class exemplified by ozokerite, paracumarone resin and carnauba wax.

In testimony whereof I affix my signature.

WINTHROP STANLEY LAWRENCE.